United States Patent

[11] 3,582,217

[72] Inventor Nicholas P. Trist
7580 San Fernando Road, Sun Valley, Calif. 91352

[21] Appl. No. 768,734
[22] Filed Oct. 18, 1968
[45] Patented June 1, 1971

[54] TAPE ALIGNMENT APPARATUS
6 Claims, 17 Drawing Figs.

[52] U.S. Cl. 356/172, 274/4
[51] Int. Cl. G01b 11/26
[50] Field of Search 356/172, 156, 247, 253, 165, 166; 350/81; 242/55.19; 274/4

[56] References Cited

UNITED STATES PATENTS

| | | | |
|---|---|---|---|
| 2,247,113 | 6/1941 | Benford | 356/172X |
| 2,557,029 | 6/1951 | Griffin | 256/172X |
| 2,574,712 | 11/1951 | Sachtleben | 256/172X |
| 3,285,526 | 11/1966 | Moore | 242/55.19 |
| 3,423,039 | 1/1969 | Zielke | 242/55.19 |
| 3,463,594 | 8/1969 | Myer | 356/172 |

*Primary Examiner*—Ronald L. Wibert
*Assistant Examiner*—T. Major
*Attorney*—Roger A. Marrs

ABSTRACT: Means are disclosed herein for determining alignment between recorded data tracks carried on magnetic tape and playback heads employed to detect the data. An endless loop of a test tape is driven past the playback head so that the dimensional distance between the top edge of the tape and the top of the playback head can be measured against microscopic scale. Should the distance be other than that set for proper playback tracking, the playback head may be vertically adjusted to compensate for any misalignment.

INVENTOR.
NICHOLAS P. TRIST
BY Roger A. Marra

INVENTOR.
NICHOLAS P. TRIST
BY
Roger A. Marrs

FIG. 8
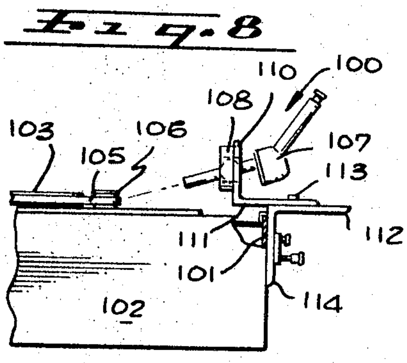
FIG. 9
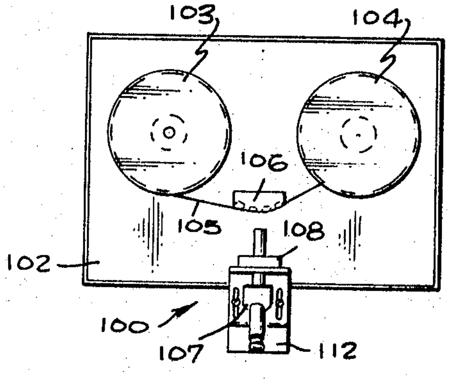
FIG. 10
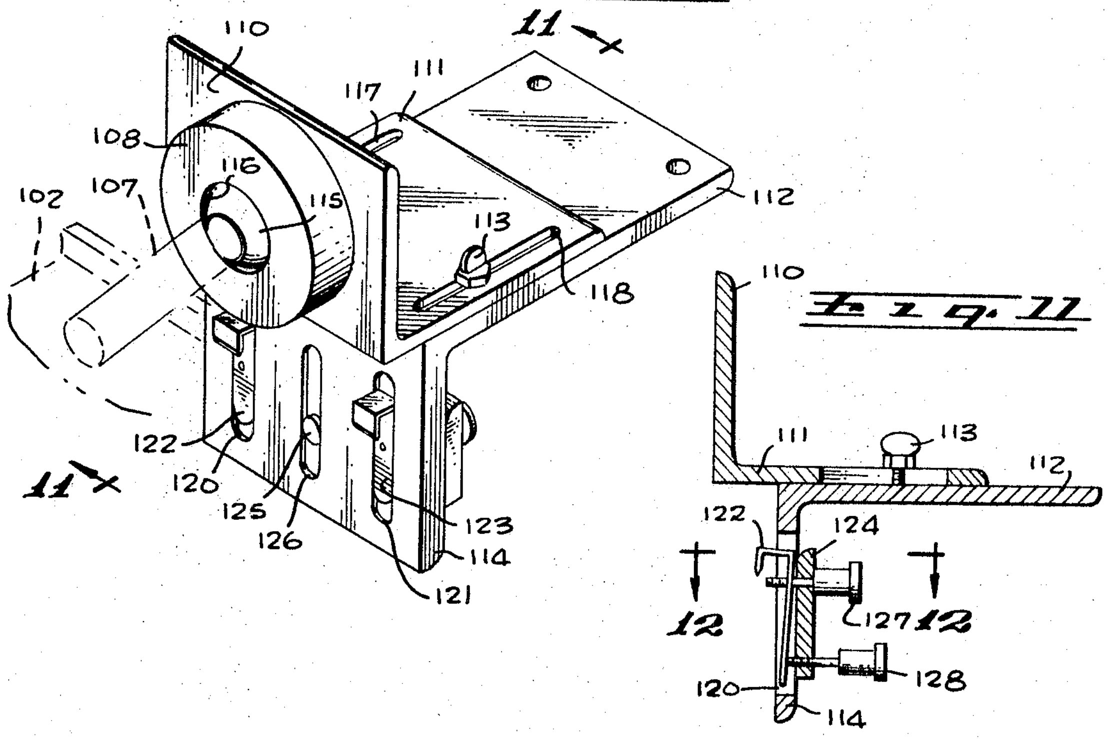
FIG. 10, FIG. 11
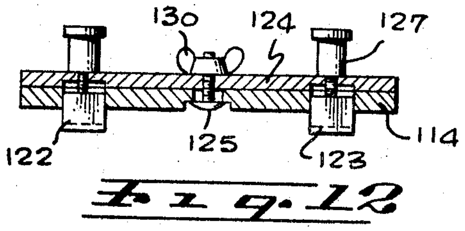
FIG. 12
NICHOLAS P. TRIST
INVENTOR.
BY Roger A. Marrs

NICHOLAS P. TRIST
INVENTOR.

BY Roger A. Marrs

TAPE ALIGNMENT APPARATUS

BACKGROUND OF THE INVENTION

1. Field of the Invention

This invention relates to the field of test instrumentation and more particularly to a novel magnetic tape alignment apparatus adapted to test and check alignment of a plurality of recorded magnetic signal tracks with respect to the playback head employed to sense the signals in each of the tracks.

2. Brief Description of the Prior Art

In recent years, magnetic tape recording has improved vastly in providing high density packing of recorded information of a fixed length of magnetic tape. This improvement has occurred most markedly in the field of prerecorded musical selections carried on the tape in parallel tracks. Originally, single track tape was employed followed by two track, four track and currently, eight track recordings. The number of tracks has caused each of the tracks to be recorded in closer proximity to adjacent tracks as the overall number of tracks has increased. Since a playback head is employed to detect the magnetic signals present in each track, it is obvious that the playback head must be properly aligned with the track being sensed so that none of the recorded information is lost.

High density packing of the magnetic signals may cause "-cross-talk" between adjacent tracks if the playback head is not properly aligned with the track or tracks being sensed. Particularly in musical recording, a sufficient number of frequencies are lost due to misalignment of the playback head with respect to the track being detected. Therefore, the setting of playback head azimuth in relation to the tracks and hence the tape per se is critical.

Conventionally, tape recorders preset playback head azimuth at the factory so that proper alignment is attained. However, repeated use of the equipment generates vibration which sometimes adversely misalign the playback head so that tracking of the tape is incorrect. Displacement of a few thousandths of an inch will generally result in frequency loss and crosstalk between adjacent recorded tracks. Such a misalignment is difficult to detect and even when detected, resetting of the playback head is a precise procedure in order to assure required accuracy. Therefore, a need has existed to provide a means for checking the alignment of the playback head with a plurality of magnetic recorded tracks carried on a tape and for measuring the amount of misalignment, if any, so that head azimuth may be reset.

SUMMARY OF THE INVENTION

Accordingly, the problems and difficulties encountered with playback head alignment are obviated by the present invention which provides a cartridge carrying an endless loop of test tape adapted to be driven past an opening formed in one end of the cartridge in close proximity to the recorder playback head. The test tape is driven by conventional tape drive means carried in the recorder which operates directly on the tape via a powered drive roller. A microscope is adjustably mounted on the cartridge having an optical axis that includes the portion of the test tape at the cartridge opening and the top of the playback head. A scale is provided in the microscope lens system whereby the distance between the top edge of the tape and the top of the playback head may be accurately measured in terms of thousandths of an inch. Any discrepancy in measurement between actual playback head azimuth and factory setting may be determined and playback head adjustment may be made to reset the head, if necessary.

Furthermore, means are provided for illuminating the optical axis so that the scale and comparison of the tape and playback head positions can be clearly observed. The intensity of the illumination is adjustable for optimum tape tracking pattern viewing.

Therefore, it is among the primary objects of the present invention to provide a novel device for determining playback head azimuth indicative of head misalignment with prerecorded magnetic information disposed in a plurality of tracks on a prerecorded tape.

Another object of the present invention is to provide a novel magnetic tape and playback head alignment sensing device that will readily determine proper playback head azimuth with respect to the tape in order to avoid the "cross-talk" and frequency loss of prerecorded magnetic signals on the tape.

Another object of the present invention is to provide a test instrument including a microscope having a graduated scale in its lens system operably to measure the distance between the top of the playback head and the top edge of a test tape to determine proper alignment or the presence of any misalignment therebetween from preset positions.

Yet another object of the present invention is to provide a novel device which enables a person to visually determine the alignment of magnetic tape in an eight-track stereo tape cartridge playback unit by means of a calibrated microscope so that proper adjustments in the playback unit may be made for alignment.

Still another object of the present invention is to provide a novel test instrument used for the purpose of eliminating "-cross-talk" and maintaining playback head azimuth adjustment in eight-track cartridge playback units.

Yet a further object of the present invention is to provide a novel test instrument carrying an endless loop of test tape and a calibrated microscope that may be employed to check tape playback head tracking and which may be employed for averaging playback head adjustment mechanism errors such as, for example, averting out cam lobe errors.

BRIEF DESCRIPTION OF DRAWINGS

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

Figures 1A, 2, 3:
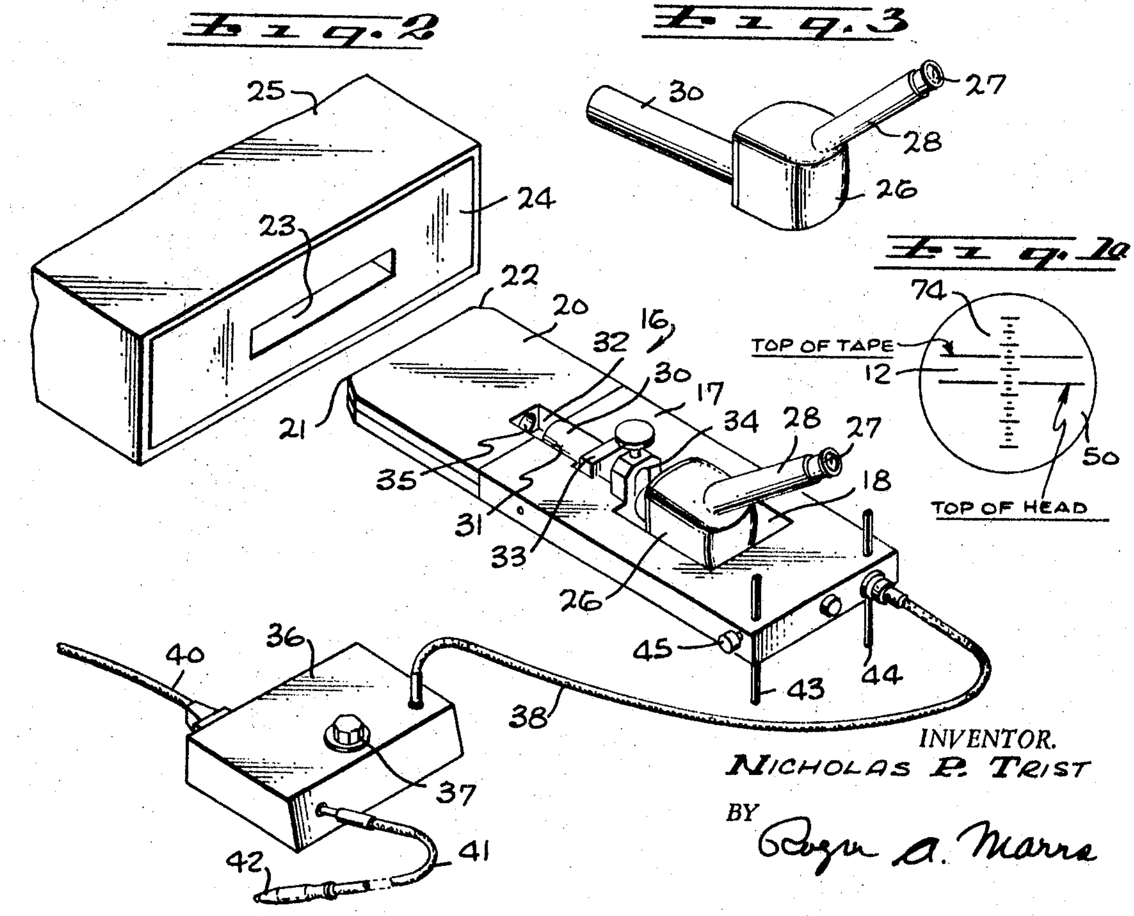
Figure 4:
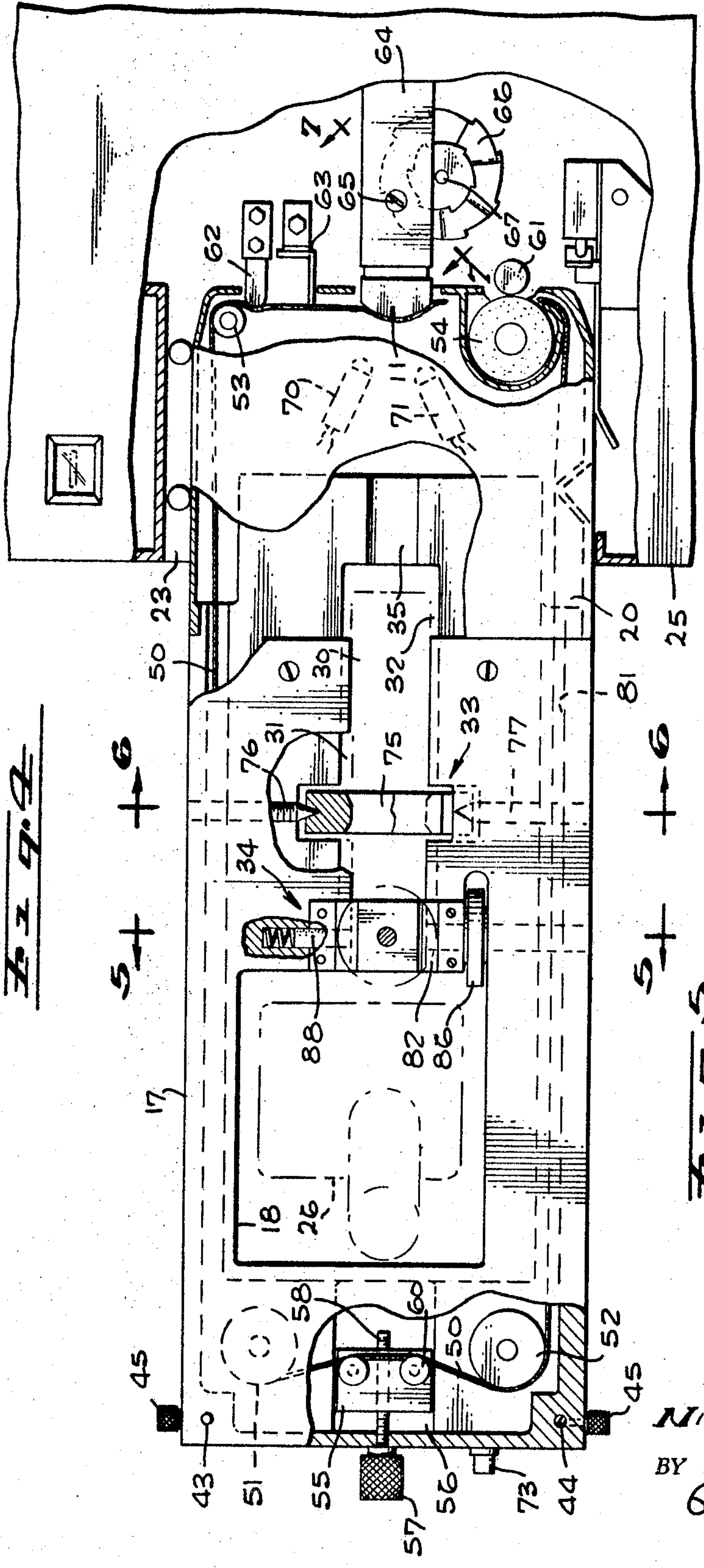
Figure 7:
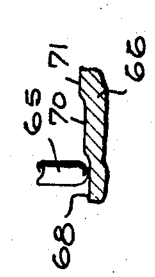
Figure 6:
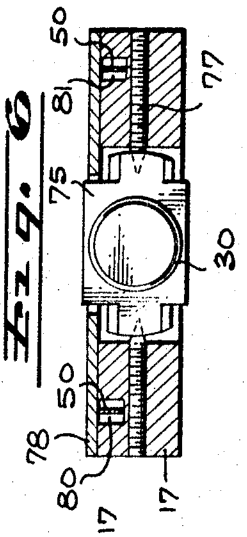
Figure 5:
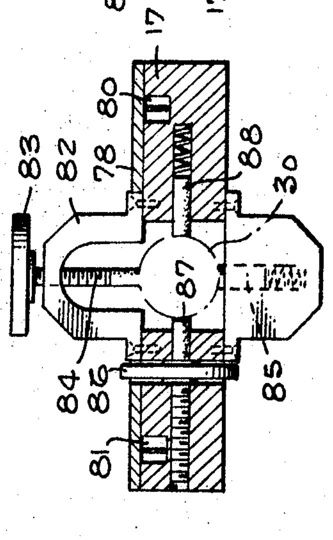
Figure 13:
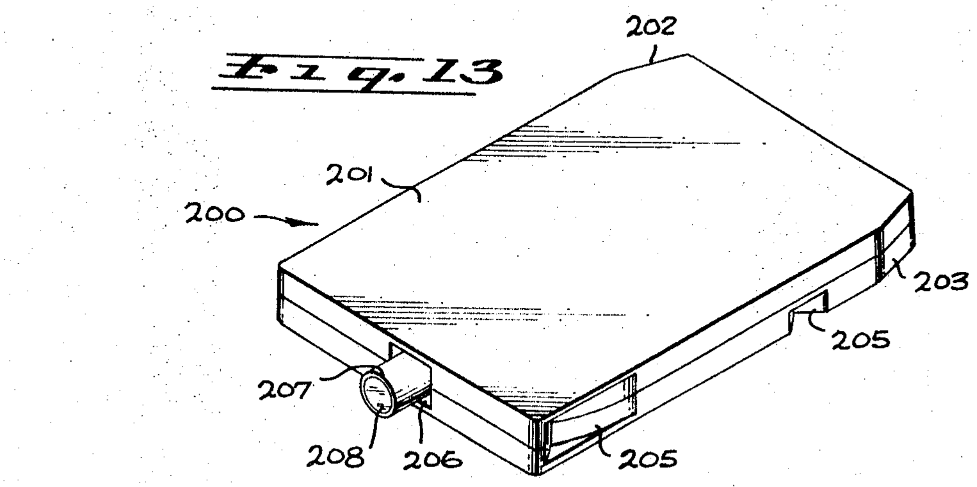
Figure 14:
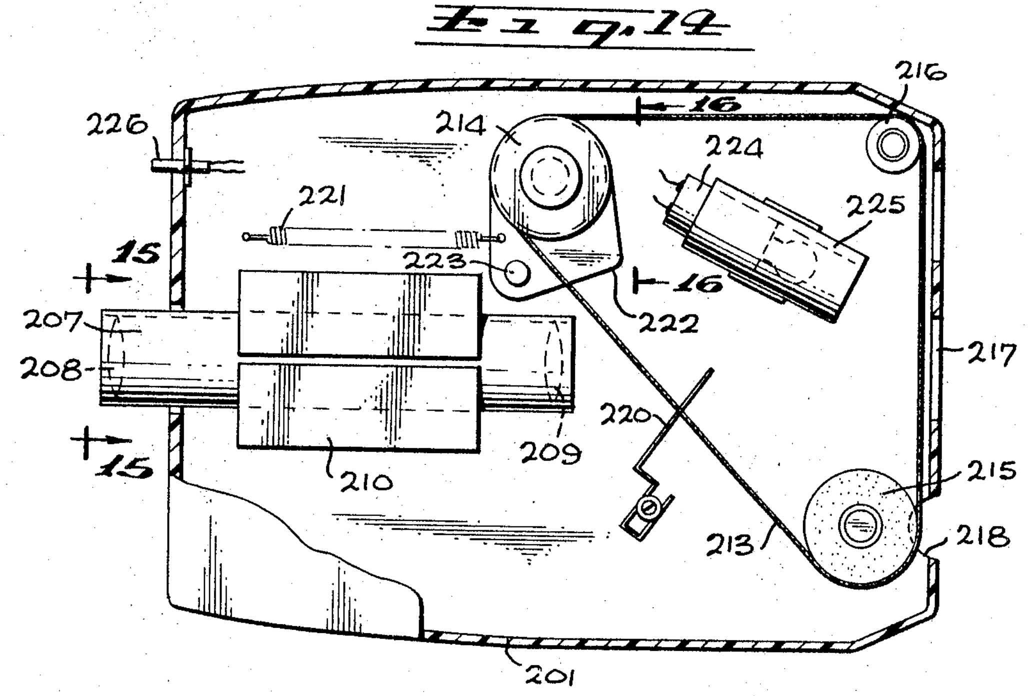
Figure 15:
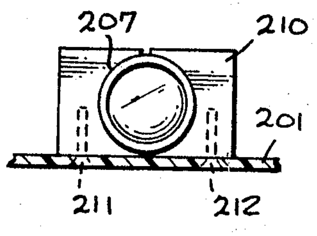
Figure 16:
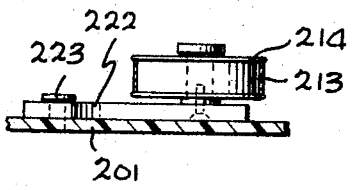

FIG. **1*a*** is a diagrammatic view of the top edge of the tape and the top of the playback head as viewed through the microscope incorporated in the present invention;

FIG. 2 is a perspective view of the tape alignment apparatus of the present invention illustrated preparatory to installation with a conventional magnetic tape playback recorder;

FIG. 3 is a perspective view of a microscope suitable for use in the tape alignment apparatus shown in FIG. 2;

FIG. 4 is a top plan view of the tape alignment apparatus installed in the playback recorder and illustrated with portions thereof broken away to show the component parts thereof;

FIG. 5 is a cross-sectional view of the microscope vertical and lateral adjustment means employed in the apparatus shown in FIG. 4 as taken in the direction of arrows 5–5 thereof;

FIG. 6 is a cross-sectional view of the microscope mounting means as taken in the direction of arrows 6–6 of FIG. 4;

FIG. 7 is a fragmentary sectional view of the playback head vertical adjustment means employed in the recorder of FIG. 4 as taken in the direction of arrows 7–7 thereof;

FIG. 8 is a side elevational view of another embodiment of the present invention for use in connection with magnetic tape storage on a reel-to-reel arrangement;

FIG. 9 is a top plan view of the tape alignment apparatus employed in the embodiment shown in FIG. 8;

FIG. 10 is an enlarged perspective view of the tape alignment apparatus shown in FIGS. 8 and 9;

FIG. 11 is a cross-sectional view of the apparatus shown in FIG. 10 as taken in the direction of arrows 11–11 thereof;

FIG. 12 is a cross-sectional view of the apparatus as taken in the direction of arrows 12–12 of FIG. 11;

FIG. 13 is a perspective view of still another embodiment of the present invention constituting a simplified version of the apparatus shown in FIG. 2;

FIG. 14 is a cross-sectional view of the apparatus shown in FIG. 13 illustrating the components parts thereof;

FIG. 15 is a sectional view of the apparatus case illustrating the microscope mounting as taken in the direction of arrows 15–15 of FIG. 14; and FIG. 16 is a sectional view of the apparatus case illustrating the tape tension means shown in FIG. 14 as taken in the direction of arrows 16–16 thereof.

DESCRIPTION OF THE PREFERRED EMBODIMENT

Figure 1:
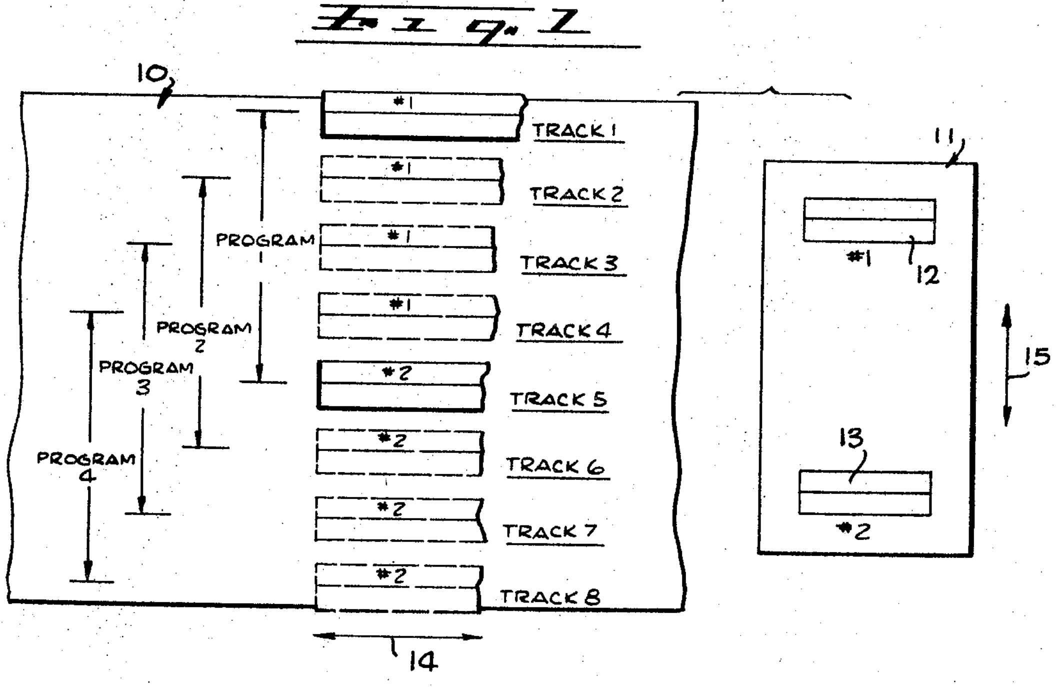
FIG. 1 is an enlarged diagrammatic view of a typical magnetic tape having eight recorded tracks and illustrating the alternate positions of the playback head with respect to selected programs.

Referring to FIG. 1, an enlarged portion of a typical magnetic recording tape is indicated by the numeral 10 that carries a plurality of magnetically recorded signals in a plurality of parallel tracks identified by the numerals 1—8 inclusive. In all stereo recordings, at least a pair of tracks are employed for a signal program. Therefore, program "one" is represented by track 1 and track 5, program "two" by track 2 and track 6, program "three" by track 3 and track 7 and program "four" by track 4 and track 8. A playback device 11 includes a playback head 12 and a second playback head 13 which are arranged in fixed spaced apart relationship such that the space inbetween covers two tracks on the tape. Therefore, for each program of the four programs, the playback device 11 will align heads 12 and 13 with two selected magnetic signal tracks carried on the tape. This alignment is shown in FIG. 1 wherein the heads 1 and 2, corresponding to heads 12 and 13, respectively, are shown in solid lines for program "one" and in broken lines for the other three programs.

The tape moves in either of the direction indicated by the error 14 so as to move the recorded information in the selected program tracks across the pair of playback head 12 and 13. However, when it is desired to change from one program to another, the playback device 11 is moved in a vertical direction in accordance with arrows 15 so that a new set of recorded tracks are selected for a new program. The means for driving the tape in accordance with arrow 14 or for vertically positioning the playback device 11 in accordance with arrow 15 are conventional mechanisms normally employed in a tape recorder unit and therefore need not be described in further detail.

To understand and appreciate the criticality of magnetic playback head alignment with selected tracks, the following dimensional information is provided which is conventional in the preparation and construction of magnetic tapes and tape recorders. For example, playback head 12 extends approximately 0.002 of an inch above the top edge of the tape in program "one" position and approximately 0.011 of an inch separates the position of the heads from one track to another. The distance between tracks on the tape taken from their centerline location is approximately 0.033 of an inch and the overall width of the tape is approximately 0.247 of an inch. The width of each playback head 12 and 13 is approximately 0.022 of an inch and the distance between the heads taken from their centerline is approximately 0.132 of an inch. Therefore, it can be seen that the alignment of the centerline of heads 12 and 13 is extremely critical with respect to the pair of tracks for each of the four programs. Tape tracking by the playback heads must be in proper alignment in order that the playback heads detect or sense the magnetic signals carried in each of the tracks whereby crosstalk of frequency loss is either nonexistent or greatly reduced.

Referring now in detail to FIG. 2, the tape alignment apparatus of the present invention is illustrated in the direction of arrow 16 which takes the form of a test tape cartridge including a rectangular base portion 17 having a central opening 18 and a forward portion 20 having chamfered corners 21 and 22 in a manner similar to a conventional tape cartridge. The forward portion 20 is adapted to be insertably received into an opening 23 formed in a forward wall 24 of a tape recorder playback unit or apparatus 25. The central opening 18 in the base 17 is adapted to removably receive a microscope 26 having an eyepiece 27 carried on one end of a tube 30 in order to accommodate viewing by the user. The tubes 28 and 30 are carried on the main body or housing of the microscope 26 and may take the form of any conventional microscope including lens system having suitable optical magnification.

The base portion 17 further includes a channel 31 interconnecting the central opening 18 with a corresponding and coextensive channel 32 formed in the forward portion 20. The channel 31 is adapted to receive tube 30 of the microscope so that the microscope may be mounted on the base by means of mountings 33 and 34 which will be described later. It is to be noted that the channel 32 in the forward portion includes an opening 35 in the rear wall thereof which lies on the optical axis of the microscope coaxially with tube 30.

In order to provide power for illumination means employed in the present invention, a taped transformer power pack 36 is employed having a manually operated dial 37 for adjusting the intensity of the light or illumination. The power back 36 is coupled to the base 17 by means of a cable 38 while a cable 40 connects the power pack to AC line voltage. However, if desired, a power cable 41 having an adapter coupler 42 carried on one end thereof, may be employed for detachable coupling with the cigarette lighter in an automobile when it is desired to use the invention in connection with tape recorder equipment installed in an automobile.

Inasmuch as the apparatus 16 is intended to be mounted through slot 23 on the recorder 25, a substantial portion of the apparatus will be cantilevered outwardly from the front panel 24. In order to support the free end of the apparatus so that the forward portion within the slot 23 is in proper position to check alignment of the playback heads 12 and 13, a pair of extendable legs 43 and 44 are slidably carried on the end of base 17. Once the apparatus has been installed in the recorder, screw fasteners 45 may be loosened so that the legs 43 and 44 will self-locate on a supporting surface, such as a table, bench or the like, after which the screw fasteners 45 are tightened to releasably secure the legs in their self-located positions. These legs will give support to the apparatus so that it will not wobble or tilt with respect to the opening 23.

Referring now in detail to FIG. 3, the microscope 26 is illustrated as being detached from the base 17 and it is further illustrated that the tube 28 is angularly disposed with respect to tube 30 so as to accommodate convenient viewing through the eyepiece 27. Inasmuch as the lens system and optical magnifying means are not a part of the present invention, it is to be understood that a suitable magnifying lens system is employed which is of conventional design.

Referring now in detail to FIG. 4, it can be seen that an endless loop of test tape 50 is movably carried on the front portion 20 and the base 17 about rear idler rollers 51 and 52, front idler roller 53 and an idler-driven roller 54. The endless loop of test tape 50 is tensioned by means of a sliding block 55 movably carried within a slotted recess 56 formed in the end of base 17 and which is operated by means of a knurled knob 57 in threadable contact with the block via a threaded shank 58. The block 55 carries a pair of rollers 60 pressing against the tape 50. Inasmuch as the rollers 60 engage the tape between the idlers 51 and 52, the tape may be tensioned as the block 55 moves rectilinearly within the recess 56. More or less tension upon the tape is provided by this adjustment.

The opposite end of the apparatus illustrates that the forward portion 20 is provided with openings adapted to receive a drive roller 61 adapted to engage against the tape 50 in driving relationship therewith and an aperture or opening for receiving the playback device 11. When the playback device is inserted through the opening, the heads 12 and 13 come into contact with the tape 50. Suitable stops and electrical switch contacts taking the form of elements 62 and 63 are employed in a conventional manner to limit the travel of the cartridge forward portion 20 in the slot 23 and to complete an electrical circuit causing the device roller 61 to be power driven.

The playback device 11 is projecting outwardly from a mount 64 which includes a downwardly projecting pin 65. The free end of the pin 65 cams against a step-level disc member 66 which is rotatably carried via a shaft 67. As shown in FIG.

7, the member 66 includes step-levels 68, 70 and 71. Therefore, the playback device 11 may be vertically adjusted in its azimuth elevation for program selection by rotating the disc member 66 so that the pin 65 rests on a selected step-level. Such a device for selecting playback head azimuth is conventional to one skilled in the art and does not form a part of the present invention. By threadably mounting the pin 65 on the mount 64, head azimuth may be adjusted in microscopic increments of a thousandths or even a millionths of an inch. The pin may be rotated with respect to the mount of manually turning the pin with a screwdriver or other suitable tool so that the free end of the point bears against the member 66 to raise or lower the playback heads.

It can be seen that the playback device 11 carrying the playback heads 12 and 13 is disposed through the central opening at the end of front portion 20 in coextensive alignment with the opening 35 and the microscope 26. Thus, the portion of tape 50 moving across the playback device 11 is exposed to viewing through the microscope so that physical observation of the tape with respect to the playback heads can be had. To provide proper illumination for such observation, a pair of lamps 70 and 72 are suitably mounted on the forward portion 20 and are connected to a power coupling 73 to which power cable 38 is detachably connected. In FIG. 1*a*, a typical view of the playback head and tape dimensional relationship is illustrated through the eyepiece 27. A graduated scale 74 is provided in the lens system of the microscope and is preferably graduated in units of thousandths of an inch so that the top of the head 12 may be measured with respect to the top edge of tape 50. If misalignment is observed, the user may adjust the playback head azimuth as previously described with respect to the positioning of point 65.

The microscope 26 is mounted on the base 17 so that tube 30 resides within channel 32 by means of a centering ring 75 through which the tube 30 is disposed in engaging relationship. The centering ring 75 is mounted between a pair of opposing pins 76 and 77 which pivotally engage against the opposite sides of the centering ring 75. As seen more clearly in FIG. 6, the pins 76 and 77 are in threadable engagement with the body of base 17 whereby rotation of the pin will cause the ring and hence, the tube 30 to be adjusted laterally in a horizontal plane, if desired. Also, it can be seen that a cover 78 is carried on the body of the base 17 so as to enclose lateral channels 80 and 81 adapted to guide and accommodate portions of the endless tape loop.

The microscope is further supported by means of mounting 34 which includes a yoke 82 rotatably supporting a knob 83 for moving a threaded shank 84 into engagement with the tube 30. This relationship is more clearly illustrated in FIG. 5 wherein the opposite side of tube 30 from its side engaged by shank 34 is seated upon a resiliently biased pin element 85. By this mans, rotation of knob 83 will adjust the vertical axis of tube 30. Furthermore, lateral adjustment of the tube may be achieved by rotation of a wheel 86 having a pin 87 engageable with a side of the tube 30 while its opposite side is engaged by a resiliently biased pin element 88.

Therefore, it can be seen that the optical axis of the microscope may be readily adjusted vertically and horizontally by means of adjustment knobs 83 and 86 in a universal manner. Such adjustments permit improved observation by the viewer and ensures an adequate and accurate viewing of the top of the tape edge and the top of the head 12 for determining alignment parameters.

Referring now to FIGS. 8 and 9, another embodiment of the present invention is illustrated within the tape alignment apparatus is illustrated in the general direction of arrow 100. The apparatus is mounted on a side panel 101 of a tape recorder 102 having a pair of reels 103 and 104. The recorder 102 is commonly known in the art as a reel-to-reel tape system in which reel 103 is a supply reel for storing a length of magnetic tape 105 in a coil or roll and wherein reel 104 is a pickup reel for drawing tape from the storage reel 103. During the transfer of tape from reel 103 to reel 104, a portion of the tape is trained past a playback unit 106 including the playback head for sensing the recorded information on the magnetic tape.

The apparatus 100 includes a microscope 107 similar to the microscope shown in FIG. 3 which is carried on a collar 108 secured to an upstanding bracket 110. The bracket 110 includes a right-angled flange 111 which is adjustably secured to a support bracket 112 by means of fasteners 113. The support bracket 112 includes a downwardly depending portion 114 which is secured to the recorder wall 101.

Referring now in detail to FIG. 10, it can be seen that the collar 108 mounts the forward tube of the magnifying microscope 107 by means of a universal member 115 that may take the form of a ball adjustably mounted in an interference fit with the spherical walls of a bore 116. The right-angled flange 111 is adjustably supported on the support bracket 112 by means of a pair of slots 117 and 118 formed in the flange in spaced parallel relationship. Each of the slots accommodates a fastener 113 which, when tightened, secures the flange 111 to the support bracket.

It is also to be noted that the support bracket portion 114 includes a pair of slots 120 and 121 which are arranged in parallel on the opposite edge marginal regions of the portion 114. These latter slots are employed to slidably mount a pair of hook or clamp members 122 and 123, respectively, adapted to engage over the top edge of panel 101 for mounting purposes. The pair of hook members are carried on a backplate 124 which includes a pin 125 slidably positionable within a slot 126 for guiding purposes. Slot 126 is located midway between the opposite sides of portion 114 and is formed in the portion between slots 120 and 121.

In FIG. 11, the attachment means including hook member 123 and back plate 124 are illustrated wherein the hook member is carried by the plate by means of adjusting screws 127 and 128. By this means, the hook members may be readily adjusted to conform to the contour of panel 101 when it is desired to mount the apparatus 100 onto the recorder 102. Each of the screw members 127 and 128 are in threadable engagement with the plate 124 so that when the screw are rotated, the clamp member 123 may be securely coupled to the panel.

FIG. 12 illustrates that pin 125 may take the form of the head of a wingnut fastener 130 which bears against the back side of the backplate 124 when tightened. By this means, the backplate carrying the clamp members 122 and 123 may be vertically adjusted with respect to the supporting bracket portion 114.

Therefore, it can be seen that the microscope 100 may be suitably mounted on collar 108 within bore 116 so that its optical axis may be directed to view the tape alignment with respect to the playback heads. For precise adjustment, the bracket 110 may be suitably adjusted by means of fasteners 113 and the support bracket 112 may be readily adjusted to properly seat against front panel 101 by the adjustment screws 127 and 128. The observation of tape alignment with respect to the playback heads is identical to the procedure described with respect to the apparatus as shown in FIGS. 2—7.

With reference to FIG. 13, another embodiment of the present invention is shown in the general direction of arrow 200. The apparatus includes a case 201 substantially similar to a conventional tape cartridge including chamfered corners 202 and 203, respectively, formed in its end adapted to be inserted into the slot of a recorder. Furthermore, the cartridge case includes notches 204 and 205 disposed in similar locations as notches provided on a conventional tape cartridge to facilitate releasably locking and securement of the cartridge case in a conventional recorder. One end of the case provides an opening 206 through which a tube 207 projects exteriorly of the case so as to present an eyepiece 208 suitable for observing tape alignment.

As shown in FIG. 14, the tube 207 is an image magnifying device, such as a microscope, which includes a lens system incorporating eyepiece 208 and a magnifying lens 209. The magnifying lens 209 includes a scale similar to the scale 74 shown in FIG. 1*a*. The magnifying tube 207 is carried on the case by means of a clamp block 210 and is secured to the case by means of screw fasteners 211 and 212 as shown in FIG. 15. Preferably, the clamp block is in two parts having hemispherical opposing surfaces which clamp about the periphery of the tube 207.

A test tape 213 is trained about idler rollers 214 and 215 as well as a corner idler 216. It is to be noted that the front portion of the case 201 includes an opening 217 so as to permit a playback unit carrying playback heads to be placed into engagement with the test tape 213 and an opening 218 is adapted to receive a drive roller for engagement with the test tape in order to drive the test tape. A tape guide 220 is employed which comprises a cantilevered wire adapted to slidably engage with the top edge of the tape 213 as the tape is moved by the recorder drive roller so as to direct the tape portion immediately ahead of the microscope out of the field of view. Tape 213 is tensioned by means of a contraction spring 221 hooked at one end to the case 201 and hooked at its opposite end to a pivotal plate 222 carried on the case by pivotal connection 223. The idler roller 214 is rotatably mounted on plate 222 and therefore, the test tape is maintained relatively taut because of the contracting tension of spring 221 urging the plate to rotate counterclockwise about a pivot 223. However, it is to be understood that the tension is yieldable so that the tape is not so rigid that it will break when the playback head is moved into contact therewith through opening 217. FIG. 16 more clearly shows the pivotal plate 222 secured on the case by pivot connection 223.

Inasmuch as the case 201 encloses the microscope 207, a suitable illumination means 224 is carried on the inside of the case within a mounting cylinder 225. The cylinder is open-ended so as to throw sufficient illumination from the lamp bulb onto the tape portion and recorder playback head within the field of observation. The bulb for the illumination means 224 is connected by suitable wires to a power coupling 226 which may be supplied from battery, line power or the like.

The apparatus 200 shown in FIGS. 13—16 inclusive represents an economic and simplified version of the apparatus shown in FIGS. 2—7. The opening 217 is in alignment with the optical axis of the microscope 207 so that the top edge of the test tape 213 may be dimensionally compared with the top of the playback head carried on the recorder within the opening 217. Inasmuch as tape 213 is endless and travels in front of the microscope lens 209, it is to be noted that the spring guide 220 is placed on top of the tape so as to guide the tape beneath the viewing area of the microscope so that only the top tape edge portion between the rollers 216 and 215 appears through the eyepiece 208. This relationship is permitted by mounting the idler roller 214 on plate 222 so that the roller 215 is lower in elevation than the idler 214. Therefore, the tape must travel from a lower elevation from idler 215 to a slightly elevated roller 214.

In view of the foregoing, it can be seen that the apparatus embodiment shown in FIGS. 2 and 13 provide a configuration similar to standard tape cartridges so as to be accepted into conventional recorders. The apparatus cartridges are equipped with transparent tape, rollers and a tapeway which simulate the tape action in a standard cartridge. The tape is put into motion by means of the driving mechanism carried in the recorder unit and the user may then view the tape tracking pattern through the microscope.

With respect to the embodiment shown in FIG. 2, light intensity adjustment may be made by rotating the knob 37 on the power pack unit 36 while the microscope may be focused by sliding the microscope backwards or forward on the base. Rotary knobs 83 and 86 are employed to center the microscope on the desired viewing area. Knob 83 is employed to adjust the microscope up and down while knob 86 is used to adjust the side-to-side motion of the scope. For best results, it is desirable to equal out the head overlap between head 1, track 1, program one and head 2, track 8, program four. This dimension is normally 0.002 inch ± 0.001 inch above and below the tape. Playback head azimuth may be reset after observing the tape edge by setting heads 12 or 13 parallel to the tape.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An alignment test apparatus for determining dimensional displacement of a playback head mounted in a tape recorder comprising:

a cartridge having a pair of adjacent openings formed in a selected end thereof for insertably receiving the playback head and the tape drive roller of the recorder when the apparatus is inserted in said recorder;

an endless loop of test tape threaded in an endless path within said cartridge to move past said pair of cartridge openings;

a plurality of idler wheels rotatably mounted in said cartridge within the loop formed by said endless tape and being in frictional supporting contact with said tape;

a plate rotatably supporting a selected one of said idler wheels and being pivotally mounted in said cartridge;

a contracting spring yieldably connected between said cartridge and said plate so as to normally bias said plate to tension said tape via said selected idler wheel;

a microscope means mounted on said cartridge having an optical axis in alignment with a selected opening when occupied by the playback head so as to establish a field of view including a portion of said tape and the playback head;

illumination means enclosed within said cartridge for illuminating said field of view; and a lens system carried in said microscope and having a graduated scale located on said optical axis thereof.

2. The invention as defined in claim 1 including means carried on said cartridge slidably engageable with a first portion of said tape loop lying between said microscope and the playback head so as to substantially direct said portion away from said optical axis while a second portion of said tape loop passes across the playback head.

3. The invention as defined in claim 1 wherein said cartridge includes a base portion opposite said selected end having a central opening communicating with an elongated channel for supporting said microscope.

4. The invention as defined in claim 3 including adjustable legs carried on the end of said case opposite to its end insertably receiving the playback head for supporting and stabilizing said base portion when said case is installed in the tape recorder.

5. The invention as defined in claim 3 including a universal means interconnecting said microscope with said base portion within said channel for movably supporting said microscope whereby said optical axis may be selectively moved.

6. The invention as defined in claim 3 including means connected to said illuminating means for adjusting the intensity of illumination emanating therefrom in said field of view.